(12) United States Patent
Kreuels et al.

(10) Patent No.: US 10,406,946 B2
(45) Date of Patent: Sep. 10, 2019

(54) VEHICLE SEAT

(71) Applicant: Adient Luxembourg Holding S.à.r.l., Luxembourg (LU)

(72) Inventors: Olaf Kreuels, Zweibruecken (DE); Christian Wolf, Dielkirchen (DE); Jan Simo, Trencin (SK)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/746,155

(22) PCT Filed: Jul. 4, 2016

(86) PCT No.: PCT/EP2016/065704
§ 371 (c)(1),
(2) Date: Jan. 19, 2018

(87) PCT Pub. No.: WO2017/012847
PCT Pub. Date: Jan. 26, 2017

(65) Prior Publication Data
US 2018/0194251 A1    Jul. 12, 2018

(30) Foreign Application Priority Data

Jul. 20, 2015  (DE) .................. 10 2015 213 621
Sep. 30, 2015  (DE) .................. 10 2015 218 873

(51) Int. Cl.
*B60N 2/20* (2006.01)
*B60N 2/235* (2006.01)
(Continued)

(52) U.S. Cl.
CPC ............. *B60N 2/2352* (2013.01); *B60N 2/20* (2013.01); *B60N 2/206* (2013.01); *B60N 2/22* (2013.01);
(Continued)

(58) Field of Classification Search
CPC ........ B60N 2/2352; B60N 2/20; B60N 2/206; B60N 2/22; B60N 2/36; B60N 2/366; B60N 2/12
(Continued)

(56) References Cited

U.S. PATENT DOCUMENTS 4,146,267 A * 3/1979 Mori .................... B60N 2/2352
                                                        297/367 R
7,086,698 B2 * 8/2006 Shiraki .................. B60N 2/206
                                                          297/354.12
(Continued)

FOREIGN PATENT DOCUMENTS

DE  10 2004 006 727 B3  7/2005
DE  10 2006 001 530 A1  7/2007
(Continued)

*Primary Examiner* — Mark R Wendell
(74) *Attorney, Agent, or Firm* — McGlew and Tuttle, P.C.

(57) ABSTRACT

A motor vehicle seat (1) includes a rear foot (2), a backrest (3), pivotable relative to the rear foot (2) about a backrest rotational axis (A), and a longitudinally adjusting seat rail pair (4). A seat rail locking device (6) locks the seat rail pair (4). A lockable fitting allows the backrest (3) to pivot into an easy-entry position for rear access. An annular drive element (18) is rotatably mounted about the backrest rotational axis (A). The drive element has a latch (24) that is caught by a driver (26), arranged on the backrest (3), when the backrest (3) is pivoted into the easy-entry position, whereby the backrest can subsequently be carried along. An actuation lever (22) acts on the latch (24) such that the latch (24) is not caught by the driver (26) when the backrest (3) is pivoted, and the backrest can be pivoted beyond the easy-entry position.

13 Claims, 9 Drawing Sheets

(51) Int. Cl.
*B60N 2/22* (2006.01)
*B60N 2/36* (2006.01)
*B60N 2/12* (2006.01)

(52) U.S. Cl.
CPC ............... *B60N 2/36* (2013.01); *B60N 2/366* (2013.01); *B60N 2/12* (2013.01)

(58) Field of Classification Search
USPC .................................................... 297/378.14
See application file for complete search history.

(56) References Cited

U.S. PATENT DOCUMENTS

| | | |
|---|---|---|
| 8,480,175 B2 | 7/2013 | Muck |
| 9,586,502 B2 * | 3/2017 | Matsufuji ............... B60N 2/12 |
| 9,969,302 B2 * | 5/2018 | Higashi ............... B60N 2/2356 |
| 2004/0021355 A1 | 2/2004 | Ohba |
| 2004/0026975 A1 * | 2/2004 | Rausch ............... B60N 2/0705 |
| | | 297/344.1 |
| 2004/0075324 A1 * | 4/2004 | Rausch .................. B60N 2/123 |
| | | 297/341 |
| 2009/0051202 A1 * | 2/2009 | Ozeki ..................... B60N 2/12 |
| | | 297/341 |
| 2010/0207440 A1 | 8/2010 | Hayakawa et al. |

FOREIGN PATENT DOCUMENTS

| | | |
|---|---|---|
| DE | 10 2013 215 028 A1 | 10/2014 |
| DE | 10 2014 206 537 A1 | 8/2015 |
| WO | 2008/019033 A1 | 2/2008 |

* cited by examiner

VEHICLE SEAT

CROSS REFERENCE TO RELATED APPLICATIONS

This application is a United States National Phase Application of International Application PCT/EP2016/065704, filed Jul. 4, 2016, and claims the benefit of priority under 35 U.S.C. § 119 of German Applications 10 2015 213 621.3, filed Jul. 20, 2015, and 10 2015 218 873.6, filed Sep. 30, 2015, the entire contents of which are incorporated herein by reference.

FIELD OF THE INVENTION

The invention relates to a vehicle seat, in particular a motor vehicle seat, having a seat member, a backrest which can be pivoted with respect to the seat member about a backrest rotation axis, at least one seat rail pair for longitudinal adjustment of the vehicle seat, a locking device for locking the at least one seat rail pair, wherein at least one lockable fitting is provided in order to articulate the backrest to the seat member, and the backrest can be pivoted into an easy-entry position which can be assumed for easier accessibility of a rear seat row.

BACKGROUND OF THE INVENTION

In the prior art, there are known different easy-entry systems for vehicle seats which enable easier entry into a second or a third seat row of a vehicle. The easy-entry system can be actuated by means of an unlocking lever, which is conventionally arranged on a backrest of the vehicle seat, whereby the backrest of the vehicle seat pivots out of an entry region.

If the vehicle seat is additionally arranged on rails, the vehicle seat may additionally or alternatively be able to be displaced in the travel direction out of the entry region when the unlocking lever is activated. In this instance, there is generally provision for a locking device of the seat rail pair to be unlocked by means of a Bowden cable which is actuated by the pivot movement of the backrest by the backrest of the vehicle seat being pivoted forward. Furthermore, the vehicle seat may have a comfort adjustment of the backrest and a loading floor function. These two functions can generally be actuated by means of a comfort lever.

Furthermore, there are known vehicle seats which can be moved into a flat floor position in order to increase the loading floor. Such systems for moving the vehicle seat into the flat floor position, in addition to a release mechanism which is arranged on the vehicle seat, can preferably also be actuated by means of a remote release unit from a region of the loading floor remote from the vehicle seat. In known systems, however, an actuation of the remote release unit in a manner known per se leads only to pivoting of the backrest as far as the easy-entry position, wherein further folding forward is not carried out even after repeated actuation of the remote release unit as a result of a counteraction of the Bowden cable engaging with the backrest. In this instance, the rails of the vehicle seat are also usually unlocked in addition.

DE 10 2013 215 028 A1 discloses an easy-entry system for a vehicle seat which has at least one fitting having at least one fitting component and a carrier profile. The at least one fitting component is coupled to a transmission element and an unlocking lever of the easy-entry system is at least indirectly connected to the transmission element. A comfort lever of a backrest is in engagement with the carrier profile and a pivot range of the backrest is limited when the easy-entry function is actuated by means of a locking detent which engages in the at least one fitting. An engagement of the locking detent in the at least one fitting can be canceled by actuating the comfort lever in order to adjust a position of the backrest.

SUMMARY OF THE INVENTION

An object of the invention is to improve a vehicle seat of the type mentioned in the introduction, in particular to carry out a function separation for moving into the easy-entry position and into the flat floor position.

This object is achieved according to the invention by a vehicle seat, in particular a motor vehicle seat, that has a rear base, a backrest which can be pivoted with respect to the rear base about a backrest rotation axis and at least one seat rail pair for longitudinal adjustment of the vehicle seat, and a locking device for locking the at least one seat rail pair. At least one lockable fitting is provided in order to articulate the backrest to the rear base and the backrest can be pivoted into an easy-entry position which can be assumed for easier accessibility of a rear seat row.

In this instance, the vehicle seat has a detent which is arranged on a drive element and which, when pivoting the backrest into the easy-entry position, can be held by a carrier which is arranged on the backrest and which can thereby also be carried so as to follow the movement of the backrest. Furthermore, an actuation lever is provided and configured to act on the detent in such a manner that, when the backrest is pivoted, the detent is not held by the carrier and the backrest can be pivoted beyond the easy-entry position.

As a result of the fact that the actuation lever, in particular to completely move the backrest into a so-called floor position, prevents the detent from being carried by the carrier of the backrest, in particular an unlocking of the locking device of the seat rail pair is prevented so that the vehicle seat while assuming the floor position does not unintentionally change the longitudinal rail adjustment thereof and additionally a stoppage or blocking of the backrest in the easy-entry position is prevented.

In this instance, there may further be provision for the detent to be rotatably supported, whereby it can maintain contact with the carrier of the backrest, which contact is accordingly adapted to a predominant inclination angle of the backrest, whereby the transmission of a drive force in order to move the drive element is further possible.

Furthermore, it may be advantageous for the drive element to be rotatably supported about the backrest rotation axis, in particular in alignment with an unlocking axis of the fitting. In this instance, a transmission of an actuation force of the actuation lever can be transmitted in a particularly simple manner to an aligned fitting or an aligned transmission rod of a fitting.

Furthermore, there may be arranged on the drive element a pulling element which acts on a Bowden cable in order to actuate the locking device of the seat rail pair. Consequently, a simple possibility for connecting the drive element to a Bowden cable of a rail locking system may be provided.

It is further advantageous for a base plate for supporting the drive element to be arranged on the rear base in order where applicable to provide a modular connection which can be produced in a uniform manner for the drive element and where applicable other fitted components which cooperate with the drive element. For example, in the case of a provided Bowden cable, it may be secured in a retention device of the base plate, in particular an end portion of a sheath of the Bowden cable may be retained.

Alternatively or additionally, the actuation lever may be pretensioned by means of a first resilient element, in particular a tension spring, in the direction of a basic position of the actuation lever. This ensures that the actuation lever is retained in a resiliently loaded manner in a basic position, which can also be referred to as a normal position, when it is not moved by an actuation force.

It is also possible for the detent to be connected to the actuation lever by means of a second resilient element, wherein the second resilient element acting as a pressure spring moves the detent into a basic position of the detent when the actuation lever is in the basic position thereof, and wherein the second resilient element acting as a tension spring moves the detent into a position which differs from the basic position thereof when the actuation lever is pivoted with respect to the basic position thereof in an actuation direction. Such a second resilient element advantageously ensures that, in the event of an actuation lever which is located in a basic position, the detent is also retained in a corresponding basic position.

There may further be provision for the drive element to be pretensioned by means of a third resilient element, in particular a tension spring, in the direction of a basic position of the drive element, whereby the possibility is afforded for the drive element to be held in a basic position, or also normal position, in which the drive element does not actuate a Bowden cable which may potentially be connected.

Furthermore, the detent, in order to limit the pivoting of the backrest, may be in abutment with an end stop in the easy-entry position. In this instance, the vehicle seat with a backrest, which is limited in terms of its pivot movement, may be moved further into the easy-entry position in further movement of the vehicle seat in the longitudinal direction of the seat rail pair, by using movement energy of the backrest, when a corresponding inclination angle of the backrest is reached.

If the vehicle seat is intended to be moved into a floor position, it may be advantageous if, in order to limit the pivoting of the backrest, the carrier is in abutment in a floor position with an end stop. This has the advantage that the backrest is not pivoted beyond an end position which is predetermined by means of the end stop and consequently the rear side of the backrest, which in the floor position pivots into the surrounding loading floor, is in alignment with the loading floor in the most planar manner possible.

Before embodiments of the invention are described in greater detail below with reference to drawings, it should first be noted that the invention is not limited to the described components or the described method steps. Furthermore, the terminology used also does not constitute any limitation, but instead is only of an exemplary nature. Whenever the singular is used below in the description and the claims, the plural is in each case also included as long as the context does not explicitly exclude this.

The invention is explained in greater detail below with reference to advantageous embodiments illustrated in the Figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
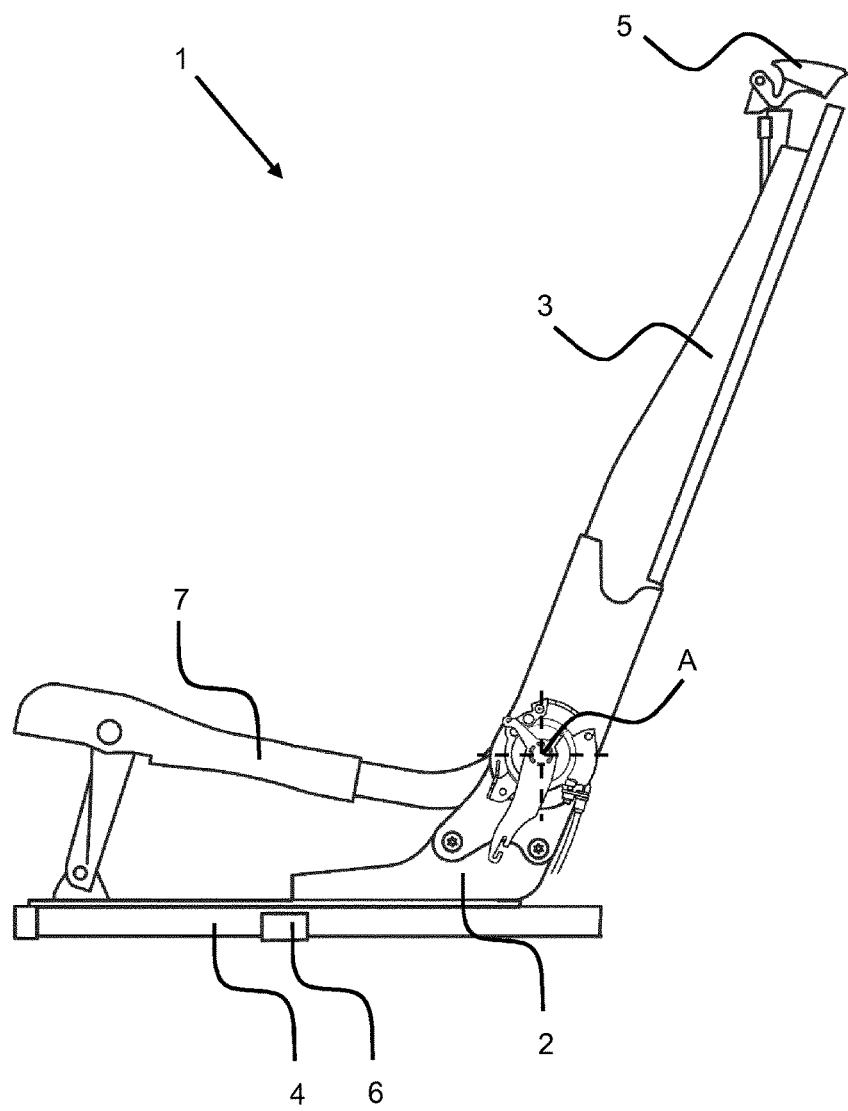
FIG. 1 is a schematic side view of a vehicle seat according to the invention.

Referring to the drawings, FIG. 1 is a side view of a vehicle seat 1 according to the invention. The vehicle seat 1 has a rear base 2, a backrest 3 which can be pivoted with respect to the rear base 2 about a backrest rotation axis A and at least one seat rail pair 4 for longitudinal adjustment of the vehicle seat 1, and a locking device 6 for locking the at least one seat rail pair 4. The rear base 2 is in this instance secured to an upper rail of the seat rail pair 4. In order to articulate the backrest 3, at least one lockable fitting is provided on the rear base 2 and the backrest 3 can be pivoted into an easy-entry position which can be assumed for easier accessibility of a rear seat row. The fitting is in this instance arranged in alignment with the backrest rotation axis A. The seat member 7 is connected to the backrest 3.

In this instance, the vehicle seat 1 has a detent 24 which is arranged on a drive element 18 which is rotatably supported about the axis A. When the backrest 3 is pivoted into the easy-entry position, the pawl 24 can be held by a carrier 26 arranged on the backrest 3, and is thereby also carried so as to follow the movement of the backrest 3.

Furthermore, an actuation lever 22 is provided and configured to act on the detent 24 in such a manner that, when the backrest 3 is pivoted, the detent 24 is not held by the carrier 26 and the backrest 3 can be pivoted beyond the easy-entry position.

The vehicle seat 1 has at least one lockable fitting. In the event that only precisely one lockable fitting is provided to articulate the backrest 3 to the rear base 2, at the side of the vehicle seat 1 opposite the fitting a non-lockable backrest bearing is arranged. In the event that both at a left side of the vehicle seat 1 and at a right side of the vehicle seat 1 a lockable fitting is arranged, these are connected to each other in a manner known per se by means of a transmission rod so that an unlocking of one fitting always leads to an unlocking of the other fitting.

In order to actuate an easy-entry function, at the upper end of the backrest 3 there is provided a handle 5 which is configured to act on a lock of the fitting in order to unlock the lock when the handle 5 is activated and to release the backrest 3 for pivoting into the easy-entry position relative to the rear base 2.

In the case described above with only one lockable fitting, there may further be provided a transmission rod which enables unlocking of the fitting by means of an actuation lever 22 which is arranged at the side of the vehicle seat 1 remote from the fitting. The actuation lever 22 is connected to the transmission rod in such a manner that a rotation movement of the actuation lever 22 in order to unlock the fitting is transmitted to the transmission rod, but a rotation movement of the transmission rod by unlocking the fitting using the handle 5 is not transmitted to the actuation lever 22.

Figure 2:
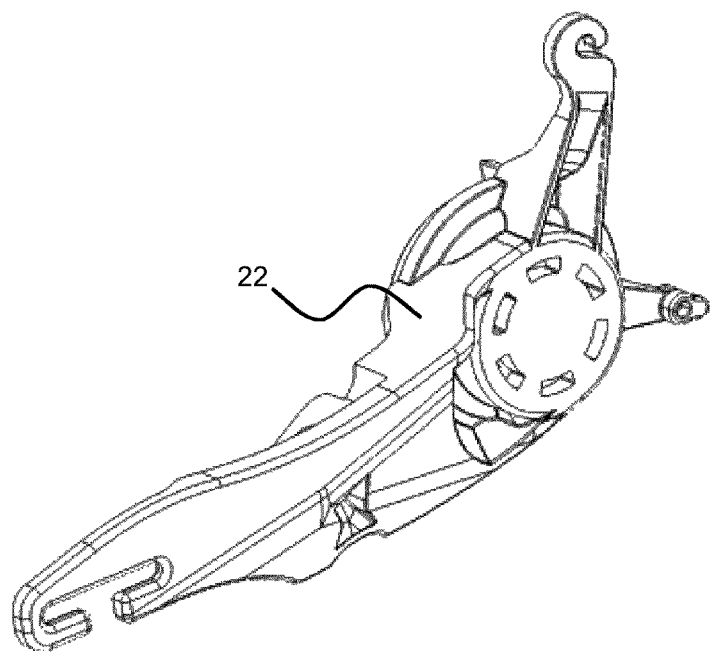
FIG. 2 is a schematic illustration of an actuation lever according to one possible embodiment of the invention.

In FIG. 2, an actuation lever 22 is illustrated according to one possible embodiment of the invention. The actuation lever 22 serves to move the vehicle seat 1 into a floor position. The actuation lever 22, in order to initiate or actuate from a position of the storage space of a motor vehicle remote from the vehicle seat 1, can be connected to a pulling means which is not illustrated.

Figure 3:
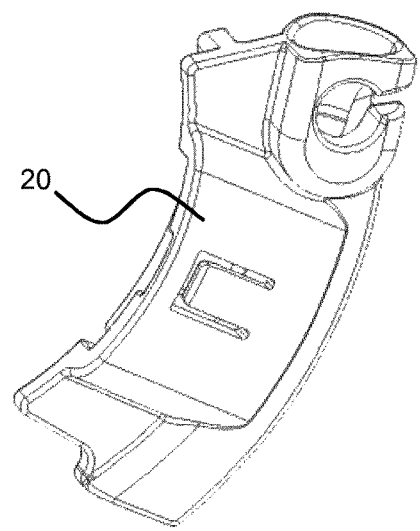
FIG. 3 is a schematic illustration of a pulling element according to one possible embodiment of the invention.

In FIG. 3, a pulling element 20 according to one possible embodiment of the invention is illustrated.

Figure 4:
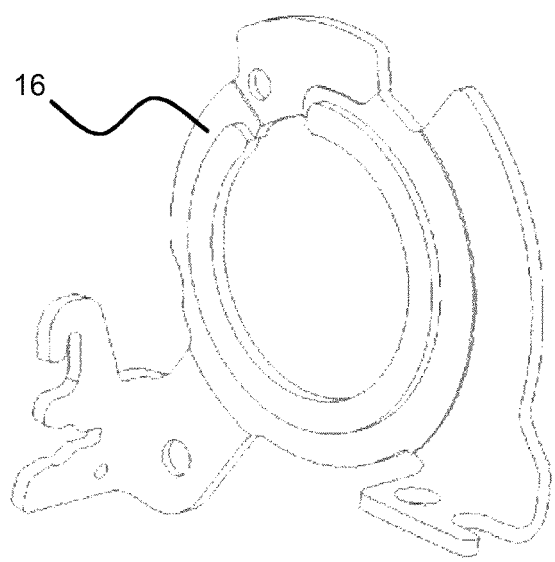
FIG. 4 is a schematic illustration of a base plate according to one possible embodiment of the invention.

In FIG. 4 a base plate 16 according to one possible embodiment of the invention is illustrated.

Figure 5:
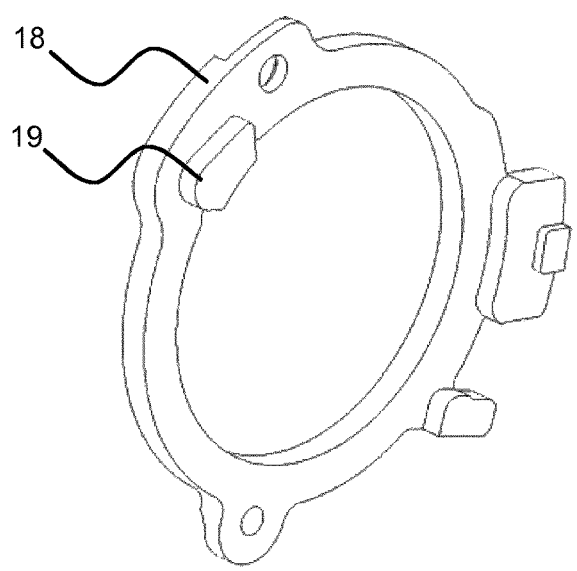
FIG. 5 is a schematic illustration of a drive element according to one possible embodiment of the invention.

In FIG. 5, the drive element 18 according to one possible embodiment of the invention is illustrated. The drive element 18 has in this instance a cam 19 which cooperates with the detent 24.

Figure 6:
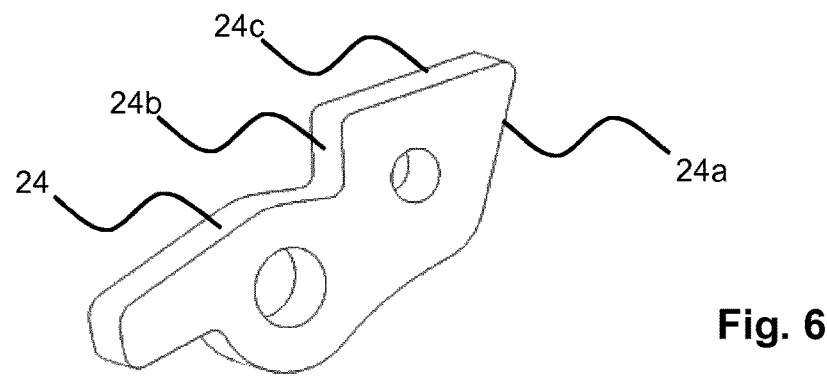
FIG. 6 is a schematic illustration of a detent according to one possible embodiment of the invention.

In FIG. 6, the detent 24 is illustrated according to one possible embodiment of the invention. The detent 24 has in this instance a first contour 24a, on which the carrier 26 when the backrest 3 is pivoted forward into the easy-entry position moves into contact with the detent 24. Furthermore, the detent 24 has a second contour 24b and a third contour 24c.

Figure 7:
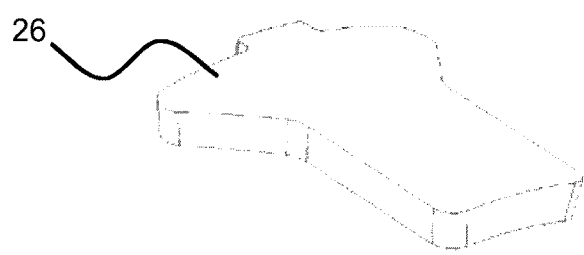
FIG. 7 is a schematic illustration of a carrier according to one possible embodiment of the invention.

In FIG. 7, the carrier 26 is illustrated according to one possible embodiment of the invention.

Figure 8:
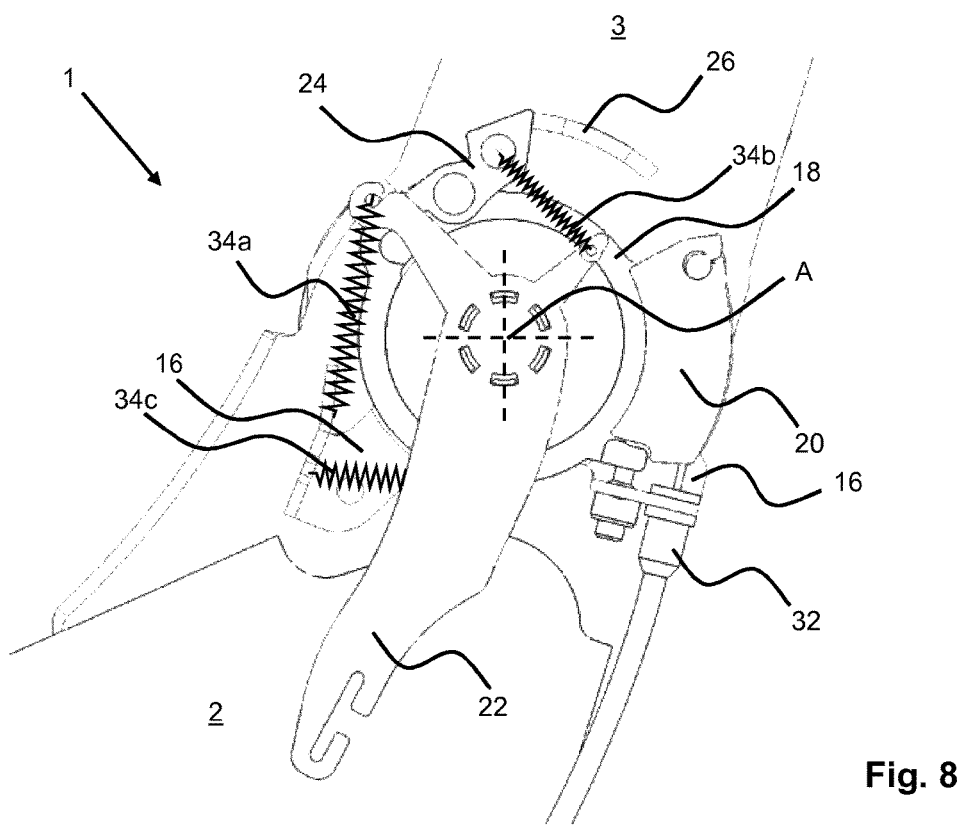
FIG. 8 is a schematic illustration of a partial cut-out of the vehicle seat in a basic position.
Figure 9:
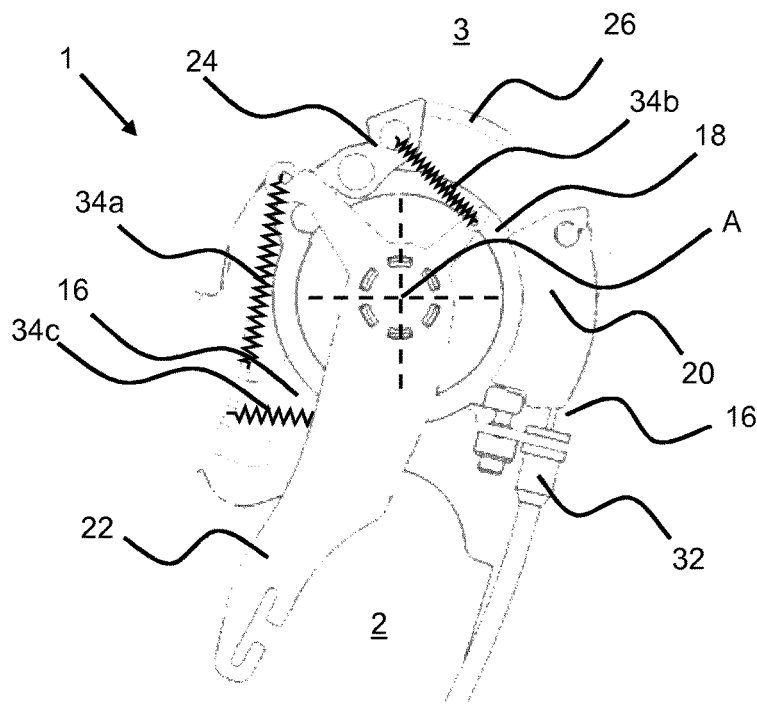
FIG. 9 is a schematic illustration of a partial cut-out of the vehicle seat in a state when the easy-entry function is activated.
Figure 10:
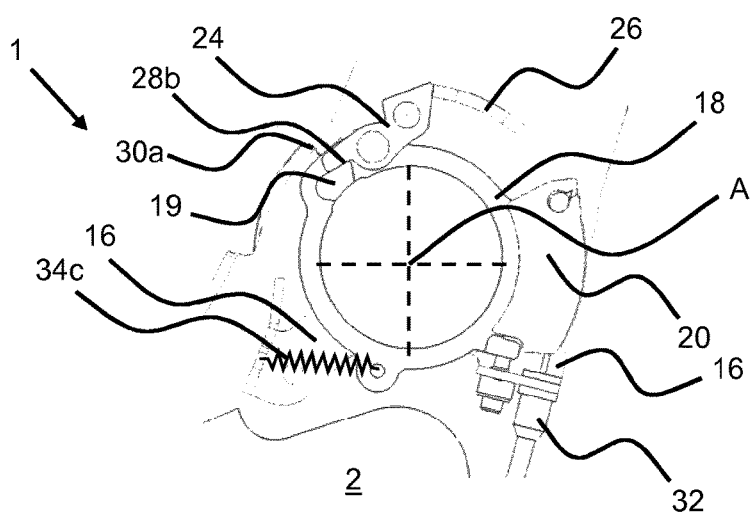
FIG. 10 is a schematic illustration of the partial cut-out of FIG. 9 with the actuation lever removed.

In FIG. 8, a partial cut-out of the vehicle seat 1 is illustrated in a basic position. The backrest 3 is in this instance preferably arranged in a position which is generally also referred to as the position for use and which is suitable for an occupant to be able to be transported in the vehicle seat 1.

The backrest 3 can be pivoted into an easy-entry position which can be assumed for easier accessibility of a rear seat row. There is further provided the detent 24 which, when the backrest 3 is pivoted into the easy-entry position, can be held by a carrier 26 which is arranged on the backrest 3 and can thereby also be carried so as to follow the movement of the backrest 3. Furthermore, the actuation lever 22 is provided.

The actuation lever 22 is configured to act, when the actuation lever 22 is actuated, on the detent 24 in such a manner that, when the backrest 3 is pivoted, the detent 24 is not held by the carrier 26 and the backrest 3 can be pivoted beyond the easy-entry position.

The base plate 16 is in this instance at least indirectly connected in a rotationally secure manner to the rear base 2, in particular to a side portion of the rear base 2 which is constructed as a frame structure. The carrier 26 is at least indirectly connected in a rotationally secure manner to the backrest 3, in particular to a side portion of the backrest 3 which is constructed as a frame structure. The drive element 18 is rotatably supported about the backrest rotation axis A. The backrest rotation axis A extends according to the illustration of FIG. 8 centrally through the drive element 18 and protrudes from the image plane in a perpendicular manner. On the base plate 16, there is further arranged an end of a Bowden cable 32 which is connected to the pulling element 20 and, when the pulling element 20 is moved, is actuated about the backrest rotation axis. The Bowden cable 32 is connected with the end thereof remote from the pulling element 20 to the rail lock 6. When the Bowden cable 32 is actuated, the rail lock 6 of the seat rail pair 4 is unlocked. The pulling element 20 is securely connected to the drive element 18. The pulling element 20 is in particular clip-fitted to a cooperating portion of the drive element 18. The detent 24 is rotatably supported on the drive element 18.

The actuation lever 22 is advantageously connected to the transmission rod with play. The play between the actuation lever 22 and the transmission rod is in particular provided so that, when the unlocking of one fitting or where applicable the two fittings which may be provided, preferably in order to activate an easy-entry function by means of the handle 5, the actuation lever 22 is not moved.

The actuation lever 22 is connected by means of a first resilient element 34a to the base plate 16 and by means of a second resilient element 34b to the detent 24. The first resilient element 34a is preferably a tension spring which serves to return the actuation lever 22 into a basic position illustrated in FIG. 8. The second resilient element 34b is preferably a tension/pressure spring which is configured to move the detent 24 into a basic position which is also illustrated in FIG. 8 when the actuation lever 22 is in the basic position thereof and to move the detent 24 into a position which differs from its basic position when the actuation lever 22 is pivoted with respect to the basic position in an actuation direction 36. The drive element 18 is connected to the base plate 16 by means of a third resilient element 34c. The third resilient element 34c is preferably a tension spring and serves to return the drive element 18 into a basic position, as shown in FIG. 8.

FIGS. 9 to 12 show a partial cut-out of a vehicle seat 1 according to the invention in different states during the actuation of an easy-entry function and are described together below.

Figure 11:
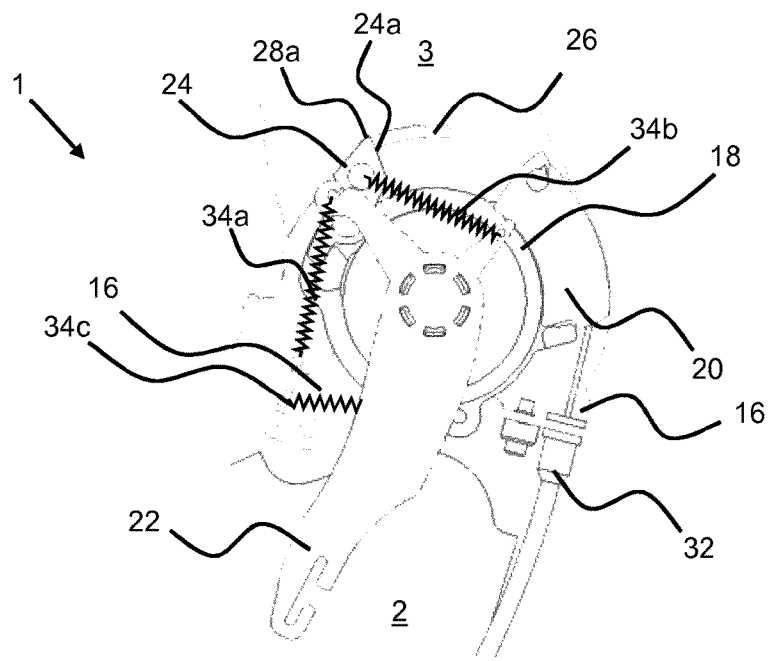
FIG. 11 is a schematic illustration of a partial cut-out of the vehicle seat in an easy-entry position.
Figure 12:
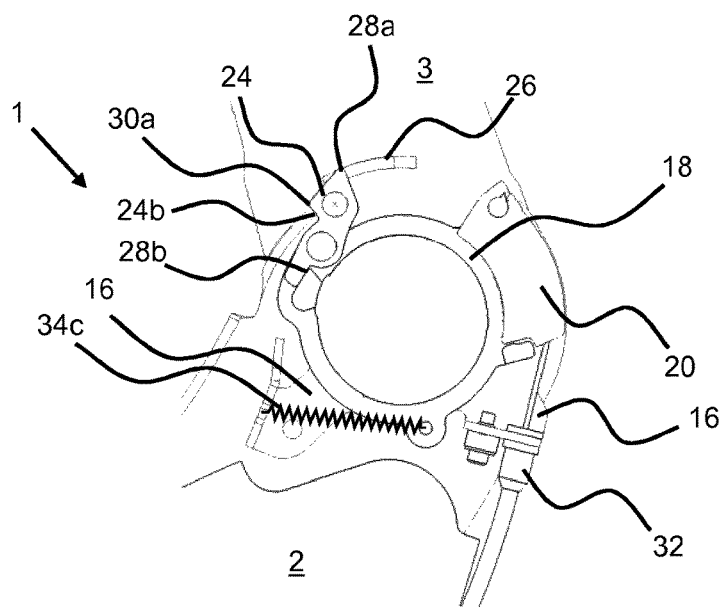
FIG. 12 is a schematic illustration of the partial cut-out of FIG. 11 with the actuation lever removed.

In the easy-entry position, entry into a rear seat row is intended to be facilitated. The easy-entry position is shown in FIGS. 11 and 12 with reference to the pivoted backrest 3. When the easy-entry function is activated, the fitting and the seat rail pair 4 which is provided for longitudinal adjustment is unlocked, whereby the backrest 3 can be folded forward as far as the easy-entry position when viewed in the viewing direction of an occupant of the vehicle seat 1 in order to enable a maximum entry region.

The fitting is unlocked by means of a mechanism which is not illustrated but which is known per se, for example, a Bowden cable, between the handle 5 and the fitting or the transmission rod. Since the actuation lever 22 is connected to the transmission rod with play, the actuation lever 22 does not move when the fitting is unlocked in order to carry out an easy-entry function.

When the backrest 3 is folded away, the carrier 26 moves into contact at a first contact location 28a with the detent 24 which is in the basic position of the detent 24—in particular with the first contour 24a of the detent 24, and carries this during its movement until the detent 24, in particular the second contour 24b of the detent 24, strikes a first end stop 30a which is integrated in the rear base 2. The first end stop 30a defines a first limit of the pivot range of the backrest 3 in the easy-entry position.

During the carrying of the detent 24, the detent 24 is supported with a portion remote from the carrier 26 by means of a second contact location 28b on the cam 19 of the drive element 18 and drives the drive element 18 in accordance with the pivot movement of the backrest 3. If the drive element 18 and the pulling element 20 which is connected to the drive element 18 is rotated in accordance with the pivot movement of the backrest 3, the Bowden cable 32 is actuated. The Bowden cable 32 acts in accordance with provisions on the locking device 6 of the seat rail pair 4 and unlocks it. In the easy-entry position, the fitting is advantageously not locked but instead retained in the easy-entry position by means of a so-called soft-lock system, as described, for example, in the German patent application with the file reference DE 10 2014 206 537.2.

Figure 13:
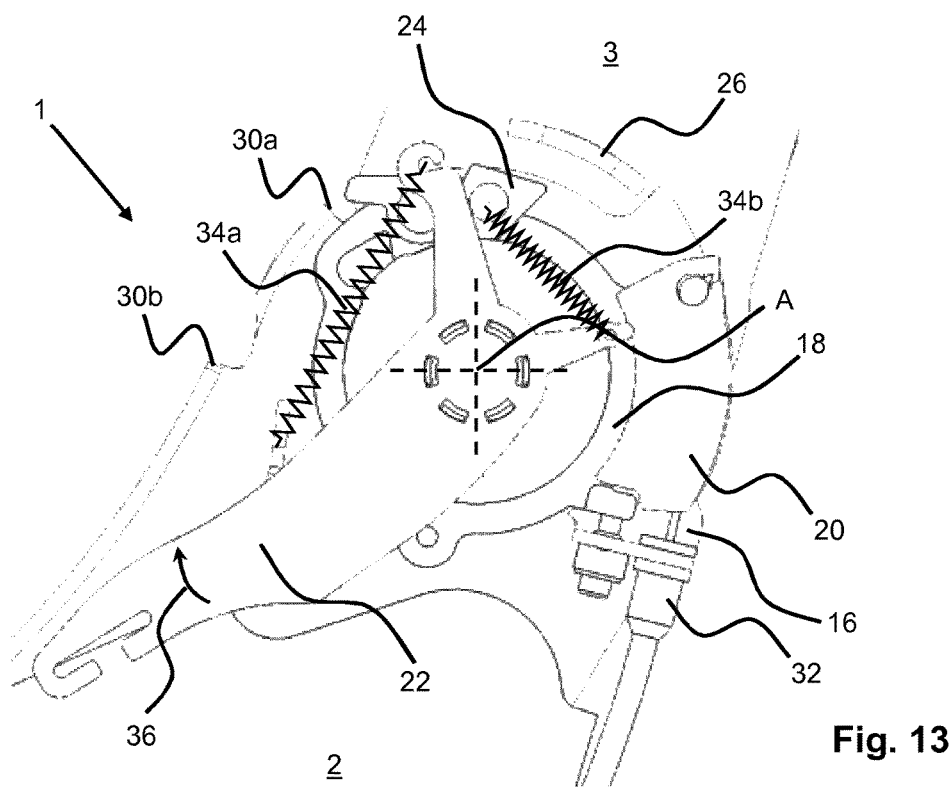
FIG. 13 is a schematic illustration of a partial cut-out of the vehicle seat in a state when the actuation lever is actuated.
Figure 14:
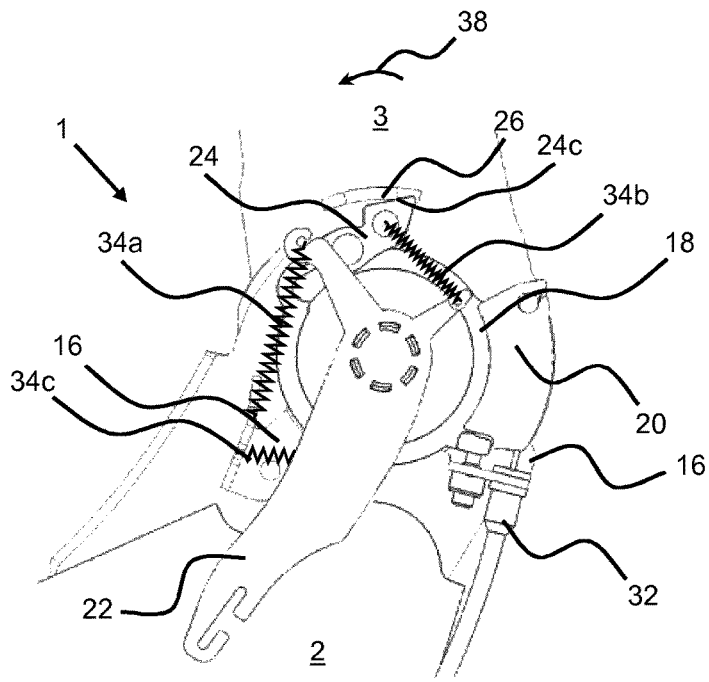
FIG. 14 is a schematic illustration of a partial cut-out of the vehicle seat in a state with a backrest pivoted partially forward.
Figure 15:
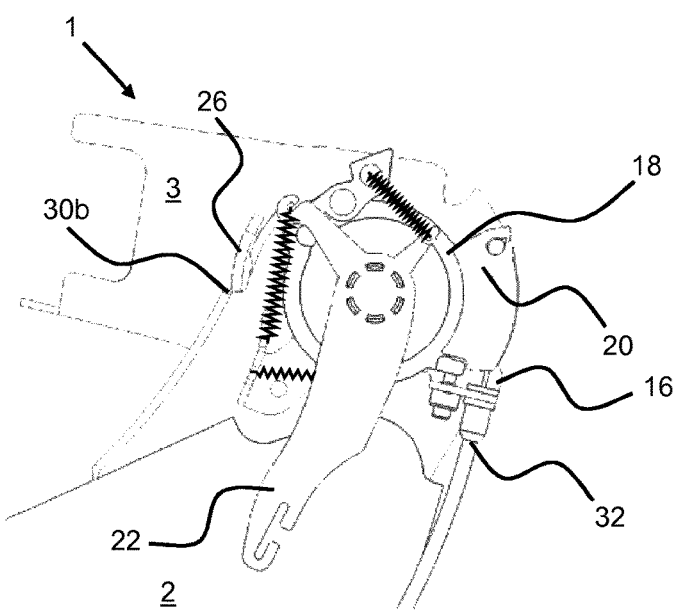
FIG. 15 is a schematic illustration of a partial cut-out of the vehicle seat in a state with the backrest pivoted completely forward.

FIGS. 13 to 15 each show a partial cut-out of a vehicle seat 1 according to the invention in different states whilst a function is activated in order to assume a floor position and are described together below.

The so-called floor position (also referred to as the fold-flat position) generally serves to increase the storage space of a motor vehicle. In the floor position, the backrest 3 is completed folded down in order to achieve the most planar possible loading floor. In this instance, the backrest 3, in particular including the rear base 2 of the vehicle seat 1, is preferably introduced into a vehicle floor in such a manner that the backrest 3 with the rear side thereof where possible forms the most planar surface possible which merges into the remaining storage space floor.

As when the easy-entry position is assumed, there is provision for the fitting to be unlocked for the purposes of pivoting the backrest 3. In contrast to the easy-entry position, however, there is no provision in this case for an unlocking of the seat rail pair 4 to be carried out. In addition, a limitation of the movement of the backrest 3 in a forward pivoting direction 38 is intended to be prevented by the support of the detent 24 between the end stop 30a and the carrier 26.

In order to enable unlocking of the fittings without corresponding unlocking of the seat rail pair 4, there is provided the actuation lever 22 which in order to assume a floor position is rotated in accordance with the actuation direction 36 about the backrest rotation axis A. The fittings are thereby unlocked. By means of the second resilient element 34b, the detent 24 is pivoted in such a manner that the detent 24 is pivoted out of the movement path of the carrier 26 of the backrest 3 and it can pivot in a forward pivoting direction 38 past the detent 24 until the backrest 3 moves into contact with an end stop 30b of the rear base 2.

When the backrest 3 is folded down and the actuation lever 22 is released, the actuation lever 22 and the detent 24 are moved back by means of the first resilient element 34a and the second resilient element 34b into their respective basic position. In the floor position, there is provision for the fitting to be locked again in order to retain the vehicle seat 1 in the floor position.

In order to raise the backrest 3 again from the floor position, the actuation lever 22 has to be moved again in the actuation direction 36 in order to unlock the fitting. Subsequently, the backrest 3 can be raised. When the backrest 3 is raised and the backrest 3 is accordingly pivoted backward counter to the forward pivoting direction 38, the carrier 26 strikes the detent 24, in particular the third contour 24c of the detent 24, and presses it briefly downward in order to pivot past the detent 24. In order to form an approach contour, the third contour 24c of the detent 24 is in this instance in the basic position of the detent 24 placed at an oblique angle with respect to the movement direction of the carrier 26 in such a manner that the carrier 26 preferably strikes the third contour 24c centrally and pivots the detent 24 about the rotatable bearing thereof.

The features disclosed in the above description, claims and drawings may be significant both individually and in combination for the implementation of the invention in its different embodiments.

Although the invention has been described in detail in the drawings and in the previous description, the illustrations are intended to be understood to be illustrative and exemplary and not limiting. In particular, the selection of the proportions of the individual elements as illustrated in the drawings is not intended to be interpreted to be necessary or limiting. Furthermore, the invention is in particular not limited to the embodiments explained. Other variants of the invention and the implementation thereof will be appreciated by the person skilled in the art from the previous disclosure, the Figures and the claims.

Terms used in the claims, such as "comprise", "have", "include", "contain" and the like do not exclude other elements or steps. The use of the indefinite article does not exclude a plurality. An individual device may carry out the functions of a plurality of units or devices mentioned in the claims.

While specific embodiments of the invention have been shown and described in detail to illustrate the application of the principles of the invention, it will be understood that the invention may be embodied otherwise without departing from such principles.

The invention claimed is:

1. A vehicle seat comprising:
   a rear base;
   a backrest which can be pivoted with respect to the rear base about a backrest rotation axis;
   at least one seat rail pair for longitudinal adjustment of the vehicle seat;
   a locking device for locking the at least one seat rail pair, wherein at least one lockable fitting is provided in order to articulate the backrest to the rear base, and the backrest can be pivoted into an easy-entry position which can be assumed for easier accessibility of a rear seat row;
   a substantially annular drive element rotatably supported relative to the backrest about the backrest rotation axis and having a detent arranged thereon;
   a carrier arranged on the backrest, wherein the detent, when the backrest is pivoted into the easy-entry position, can be held by the carrier and can thereby also be carried so as to follow movement of the backrest; and
   an actuation lever provided and configured to act on the detent such that, when the backrest is pivoted, the detent is not held by the carrier and the backrest can be pivoted beyond the easy-entry position.

2. The vehicle seat as claimed in claim 1, wherein the detent is rotatably supported.

3. The vehicle seat as claimed in claim 1, further comprising a Bowden cable and a pulling element, wherein the pulling element is arranged on the drive element and the pulling element acts on the Bowden cable to actuate the locking device of the seat rail pair.

4. The vehicle seat as claimed in claim 3, wherein the pulling element is clip-fitted to a cooperating portion of the drive element.

5. The vehicle seat as claimed in claim 3, wherein the rear base has a base plate retaining an end portion of a sheath of a Bowden cable which Bowden cable is connected to the pulling element.

6. The vehicle seat as claimed in claim 1, further comprising a base plate supporting the drive element and arranged on the rear base.

7. The vehicle seat as claimed in claim 1, further comprising a resilient element, wherein the actuation lever is pretensioned by the resilient element toward a basic position of the actuation lever.

8. The vehicle seat as claimed in claim 7, wherein the resilient element is a tension spring.

9. The vehicle seat as claimed in claim 1, further comprising a resilient element, wherein the detent is connected to the actuation lever by the resilient element, wherein the resilient element acting as a pressure spring moves the detent into a basic position of the detent when the actuation lever is in the basic position thereof, and wherein the resilient element acting as a tension spring moves the detent into a position which differs from the basic position thereof when the actuation lever is pivoted with respect to the basic position thereof in an actuation direction.

10. The vehicle seat as claimed in claim 1, further comprising a resilient element, wherein the drive element is pretensioned by the resilient element in a direction of a basic position of the actuation lever.

11. The vehicle seat as claimed in claim 10, wherein the resilient element comprises a tension spring.

12. The vehicle seat as claimed in claim 1, further comprising an end stop, wherein the detent, to limit the pivoting of the backrest, is in abutment with the end stop in the easy-entry position.

13. The vehicle seat as claimed in claim 1, further comprising an end stop, wherein the carrier, to limit the pivoting of the backrest, is in abutment in a floor position with an end stop.

* * * * *